US008867200B2

(12) United States Patent
Suzuki et al.

(10) Patent No.: US 8,867,200 B2
(45) Date of Patent: Oct. 21, 2014

(54) ELECTRONIC APPARATUS

(75) Inventors: Hiromichi Suzuki, Hamura (JP); Takashi Minemura, Ome (JP); Yuji Nakajima, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 169 days.

(21) Appl. No.: 13/396,459

(22) Filed: Feb. 14, 2012

(65) Prior Publication Data

US 2012/0206896 A1 Aug. 16, 2012

(30) Foreign Application Priority Data

Feb. 15, 2011 (JP) ................................ 2011-030117
Nov. 22, 2011 (JP) ................................ 2011-254803

(51) Int. Cl.
*H05K 5/00* (2006.01)

(52) U.S. Cl.
USPC ............. 361/679.04; 361/679.27; 361/679.3; 345/1.3

(58) Field of Classification Search
USPC ........... 361/679.27, 679.3, 679.04; 345/5, 1.3
See application file for complete search history.

(56) References Cited

U.S. PATENT DOCUMENTS 6,016,176 A * 1/2000 Kim et al. ..................... 349/84
6,262,785 B1 * 7/2001 Kim ............................ 349/58
6,377,324 B1 * 4/2002 Katsura ....................... 349/58
6,483,482 B1 11/2002 Kim
6,577,496 B1 * 6/2003 Gioscia et al. ............ 361/679.3
6,927,908 B2 8/2005 Stark
7,095,387 B2 * 8/2006 Lee et al. ..................... 345/4
7,714,801 B2 * 5/2010 Kimmel ...................... 345/1.3
7,876,288 B1 * 1/2011 Huang .......................... 345/4
8,581,859 B2 11/2013 Okumura et al.
2004/0052044 A1 * 3/2004 Mochizuki et al. .......... 361/683
2004/0159710 A1 * 8/2004 Silverbrook ................. 235/492
2005/0050686 A1 3/2005 Kurokawa
2006/0146488 A1 * 7/2006 Kimmel ....................... 361/681
2008/0158795 A1 * 7/2008 Aoki et al. ................... 361/681
2008/0192416 A1 * 8/2008 Kim ............................ 361/681
2009/0051830 A1 2/2009 Matsushita et al.

FOREIGN PATENT DOCUMENTS

JP H05-188873 A 7/1993
JP H11-085108 A 3/1999
JP 2001-005414 A 1/2001
JP 2004-524551 A 8/2004
JP 2005-023955 A 1/2005

(Continued)

OTHER PUBLICATIONS

First Office Action dated Jun. 12, 2012 in Japanese Patent Application No. 2011-254803, 10 pgs.

(Continued)

*Primary Examiner* — Hung Ngo
(74) *Attorney, Agent, or Firm* — Knobbe, Martens, Olson & Bear LLP

(57) ABSTRACT

According to one embodiment, an electronic apparatus includes a first housing, a first display and a transparent first panel. The first display in the first housing includes a first display portion. The first panel covers the first display portion and includes a first flat surface portion and a first curved surface portion along an outer edge of the first flat surface portion. The first display portion displays images in a location corresponding to the first flat surface portion and a location corresponding to the first curved surface portion respectively at different aspect ratios from each other.

8 Claims, 11 Drawing Sheets

1 14 34 28 27 5 47 48 54 14 53 33 26 46 24 44 23 43 31 51 22 42 P1 P2 3 4 25 21 41 45

(56) References Cited

FOREIGN PATENT DOCUMENTS

| | | | |
|---|---|---|---|
| JP | 2005-115069 | A | 4/2005 |
| JP | 2006-113501 | A | 4/2006 |
| JP | 2007-077649 | A | 7/2007 |
| JP | 2009-282433 | A | 12/2009 |
| JP | 2010-157060 | A | 7/2010 |
| WO | WO 02/42838 | A1 | 5/2002 |
| WO | WO 2008/149449 | A1 | 12/2008 |
| WO | WO 2010/070871 | A1 | 6/2010 |
| WO | WO 2010/122618 | A1 | 10/2010 |
| WO | WO 2011/001933 | A1 | 1/2011 |

OTHER PUBLICATIONS

Decision of Rejection dated Sep. 11, 2012 in Japanese Patent Application No. 2011-254803 in 6 pages.

First Office Action dated Jul. 16, 2013 in Japanese Patent Application No. 2012-179419 in 8 pages.

* cited by examiner

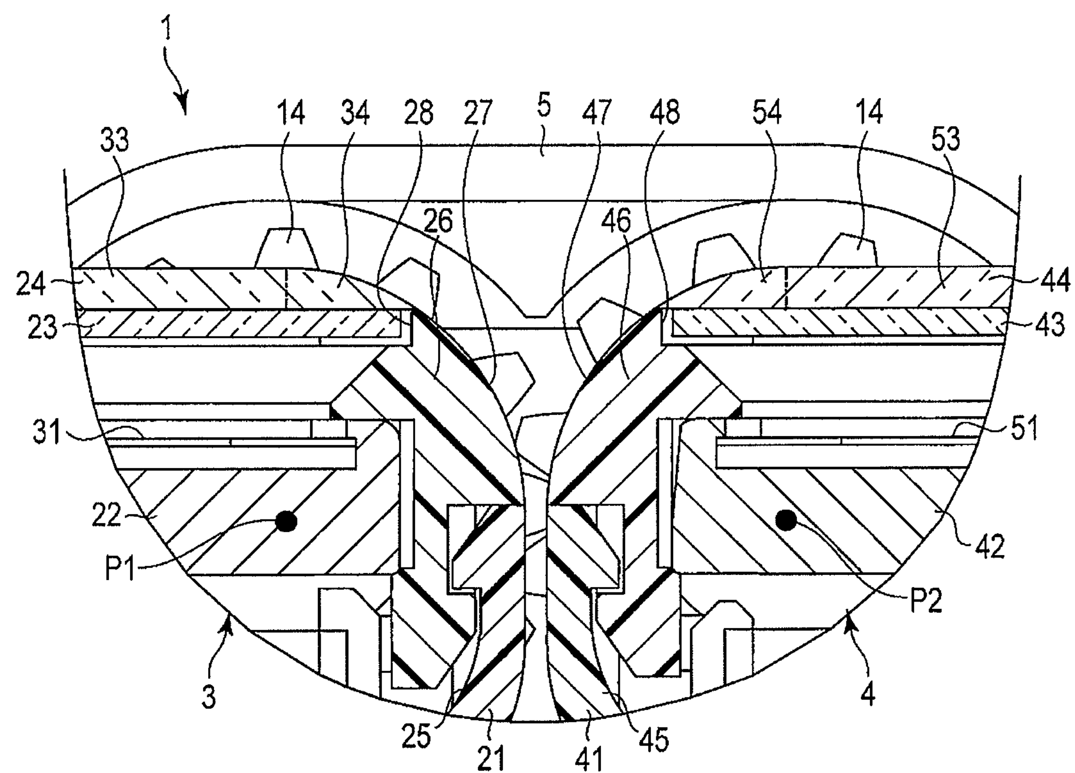
F I G. 3
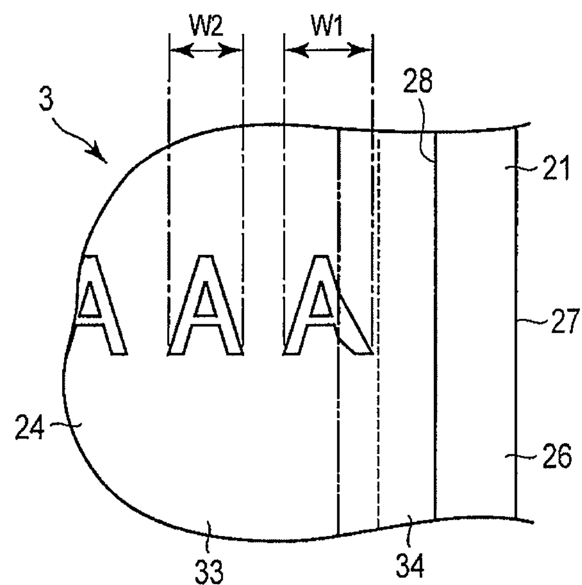
F I G. 4

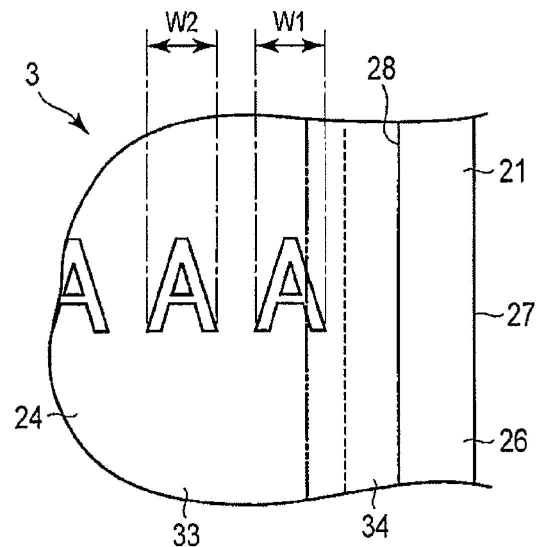
F I G. 5
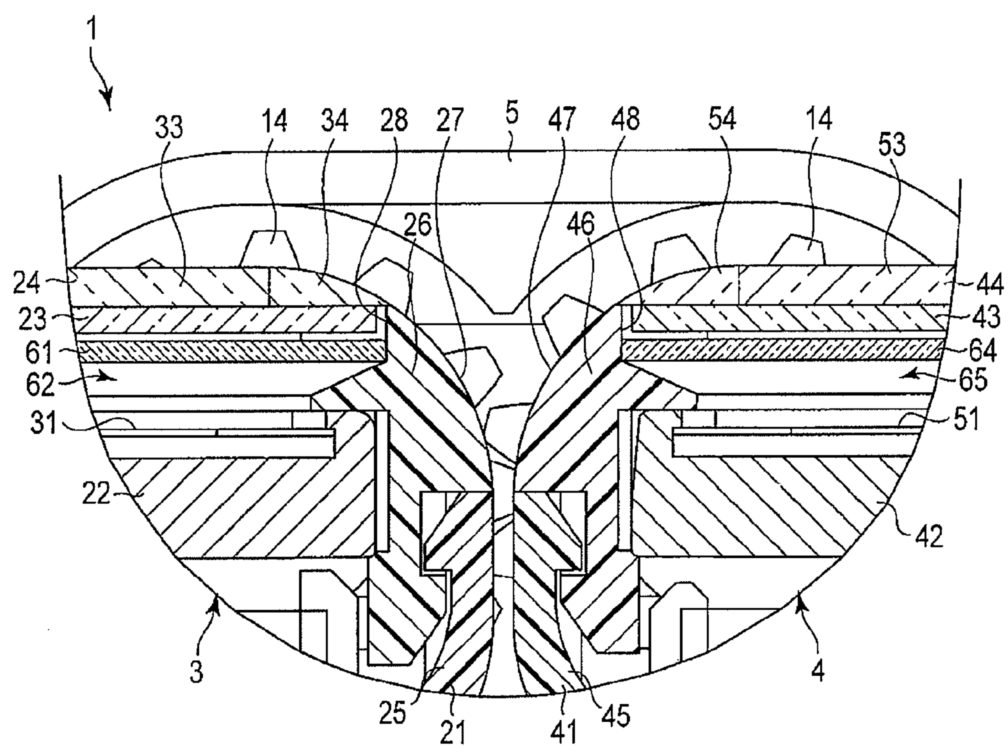
F I G. 7

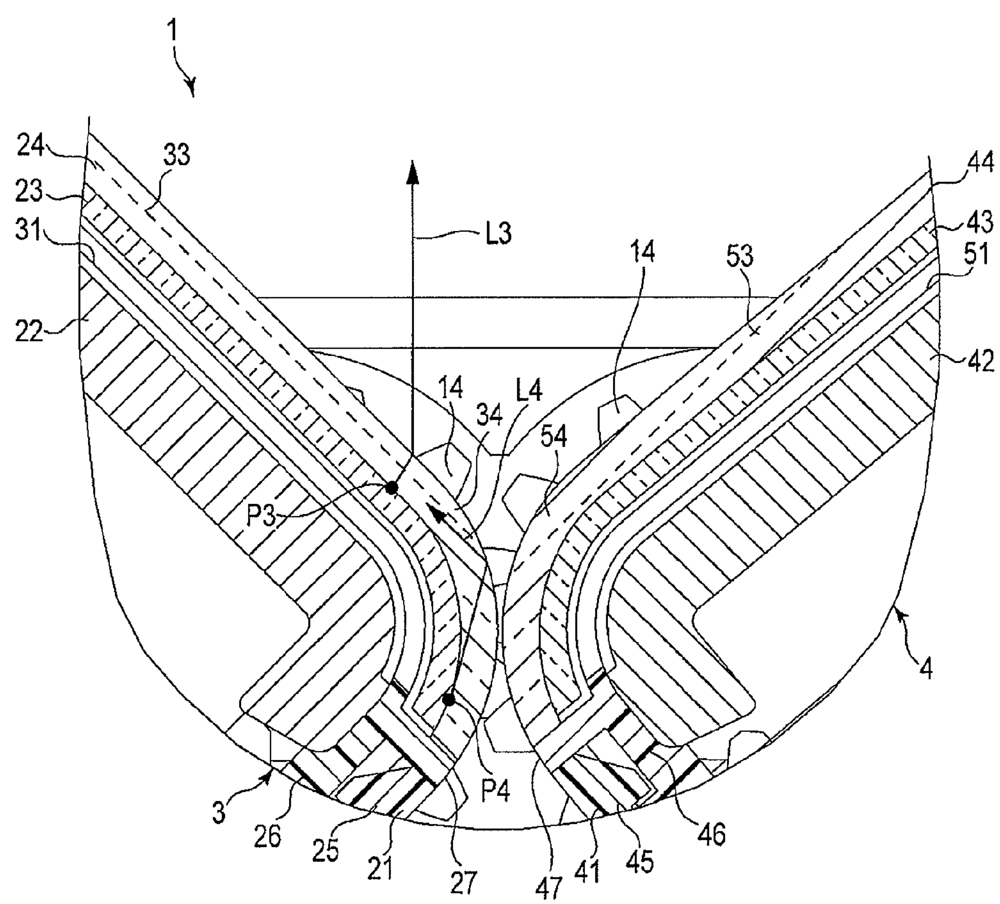
F I G. 10

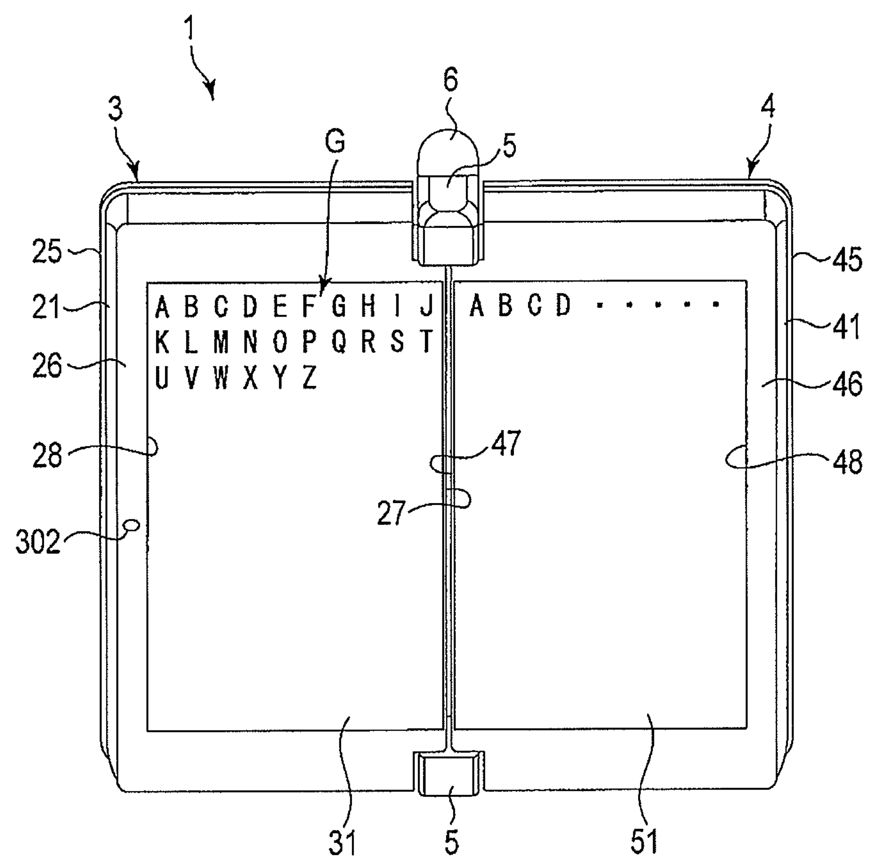
F I G. 11

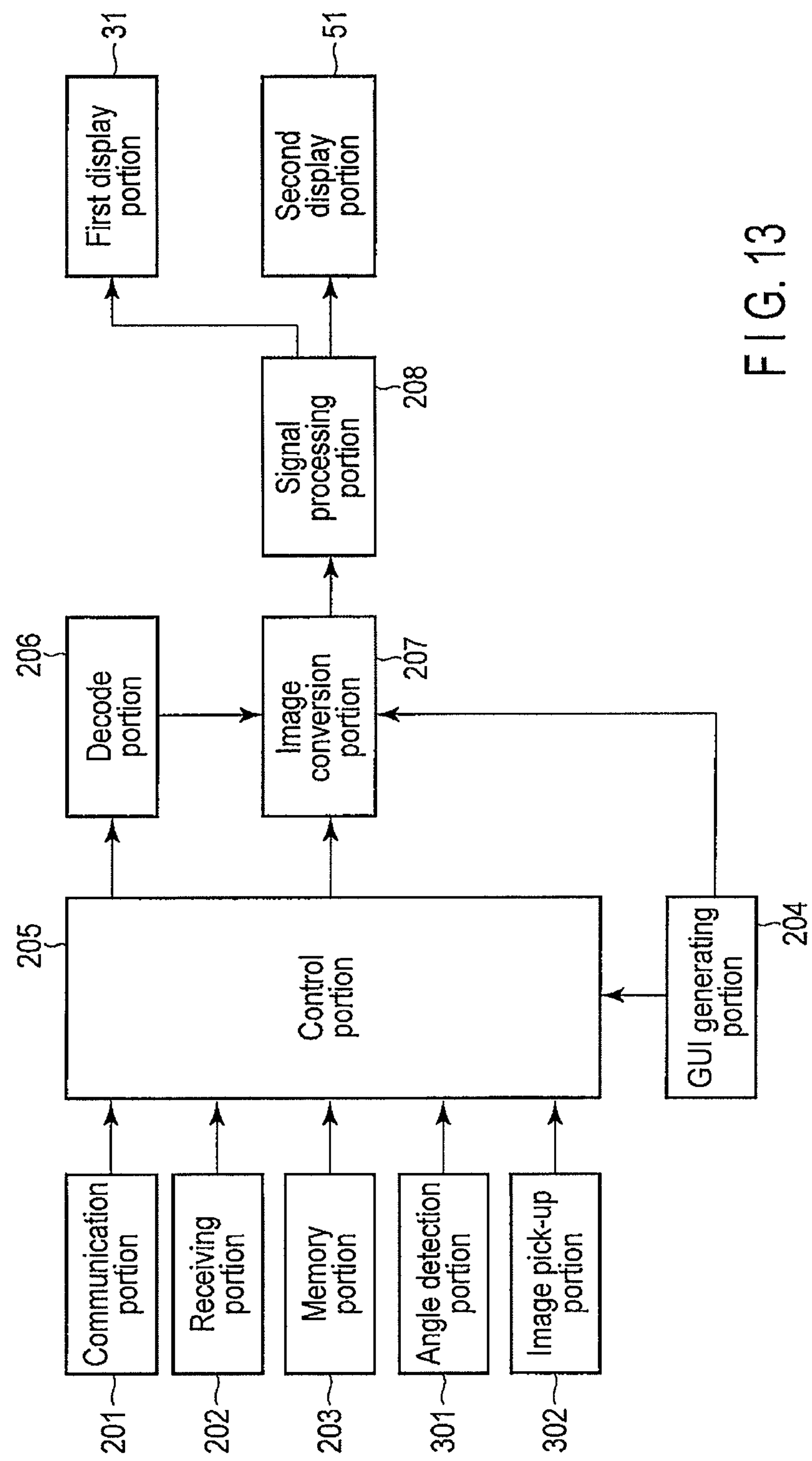
F I G. 13

ELECTRONIC APPARATUS

CROSS-REFERENCE TO RELATED APPLICATIONS

This application is based upon and claims the benefit of priority from prior Japanese Patent Applications No. 2011-030117, filed Feb. 15, 2011; and No. 2011-254803, filed Nov. 22, 2011, the entire contents of all of which are incorporated herein by reference.

FIELD

Embodiments described herein relate generally to an electronic apparatus.

BACKGROUND

Some of electronic apparatus used to, for example, read and view electronic books or publications comprise an open and close structure as of books. Such an electronic apparatus comprises a pair of units connected with a hinge. The pair of units each displays documents, images, web pages and other information, and these displayed items are read and viewed while the units are open.

The display portion of the units displaying information items such as documents is enclosed by a frame, which is a part of the housing of the unit. With this structure, the display portion of one unit and that of the other unit are separated by each frame, which makes it difficult for the read to see the two display units as one large display portion.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary enlarged cross sectional view of the electronic apparatus according to the first embodiment;

FIG. 4 is an example of the state in which a first unit of the first embodiment shows an image;

FIG. 5 is an example of the state in which the image shown on the first unit of the first embodiment is corrected;

FIG. 7 is an exemplary cross sectional view showing the electronic apparatus according to the second embodiment;

FIG. 10 is an exemplary cross sectional view explaining a trace of light in the electronic apparatus according to the third embodiment;

FIG. 11 is an exemplary perspective view showing the electronic apparatus according to the fourth embodiment in which the first and second units are opened by an angle of 180°;

FIG. 13 is a block diagram of the functions of the electronic apparatus according to the fourth embodiment.

DETAILED DESCRIPTION

Various embodiments will be described hereinafter with reference to the accompanying drawings.

In general, according to one embodiment, an electronic apparatus includes a first housing, a first display and a transparent first panel. The first display in the first housing includes a first display portion. The first panel covers the first display portion and includes a first flat surface portion and a first curved surface portion along an outer edge of the first flat surface portion. The first display portion displays images in a location corresponding to the first flat surface portion and a location corresponding to the first curved surface portion respectively at different aspect ratios from each other.

Figure 1:
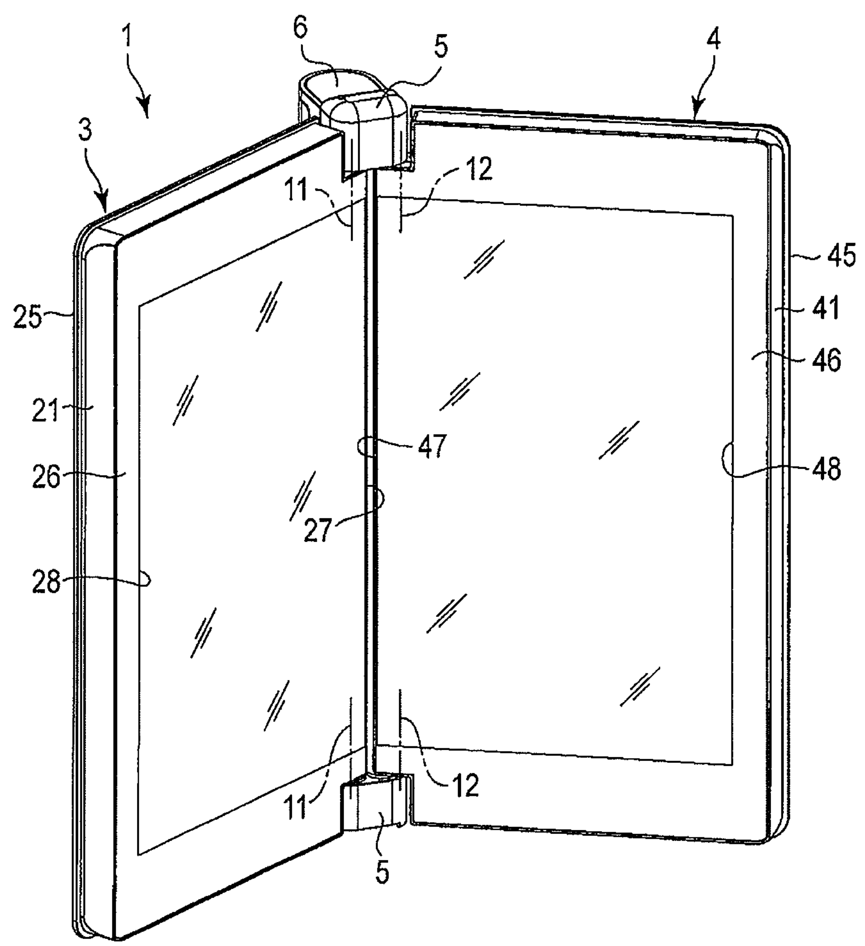
FIG. 1 is an exemplary perspective view showing the electronic apparatus according to the first embodiment.

The first embodiment will now be described with reference to FIGS. 1 to 5. FIG. 1 is an exemplary perspective view showing an electronic apparatus 1 according to the first embodiment. It should be noted here that in this specification, the upper direction in the state in which the electronic apparatus 1 is set upright as shown in FIG. 1 is defined as up, the lower direction in the same state is defined as down for the convenience of explanation. The electronic apparatus 1 is used as, for example, a portable computer or an electronic book reader.

As shown in FIG. 1, the electronic apparatus 1 comprises a first unit 3, a second unit 4, a pair of hinge portions 5 and a protruding portion 6. The first unit 3 and the second unit 4 are coupled together to be pivotable with respect to each other by the pair of hinge portions 5. The first unit 3 and the second unit 4 are freely opened and closed between the open position where they are open at 180 degrees and the close position where they are closed one on another.

One of the hinges 5 is provided over from the upper end of an inner end portion of the first unit 3 to the upper end of an inner end portion of the second unit 4. The other hinge 5 is provided over from the lower end of an inner end portion of the first unit 3 to the lower end of an inner end portion of the second unit 4. It is alternatively possible to take such a structure a hinge is provided for only one of the upper and lower ends in order to allow various types of wires such as control lines and power lines connecting between the first unit 3 and the second unit 4 to pass therethrough.

The pair of hinge portions 5 comprise a first shaft portion 11 and a second shaft portion 12, respectively. It should be noted that the first shaft portion 11 and the second shaft portion 12 are hidden in FIG. 1, and therefore the rotation shaft of the first shaft portion 11 and the rotation shaft of the second shaft portion 12 are each shown schematically by an alternate long and short dash line. The first shaft portion 11 supports the first unit 3 to be pivotable and the second shaft portion 12 supports the second unit 4 to be pivotable. A pair of the first shaft portions 11 and a pair of the second shaft portion 12 are arranged to be in parallel with each other.

Figure 2:
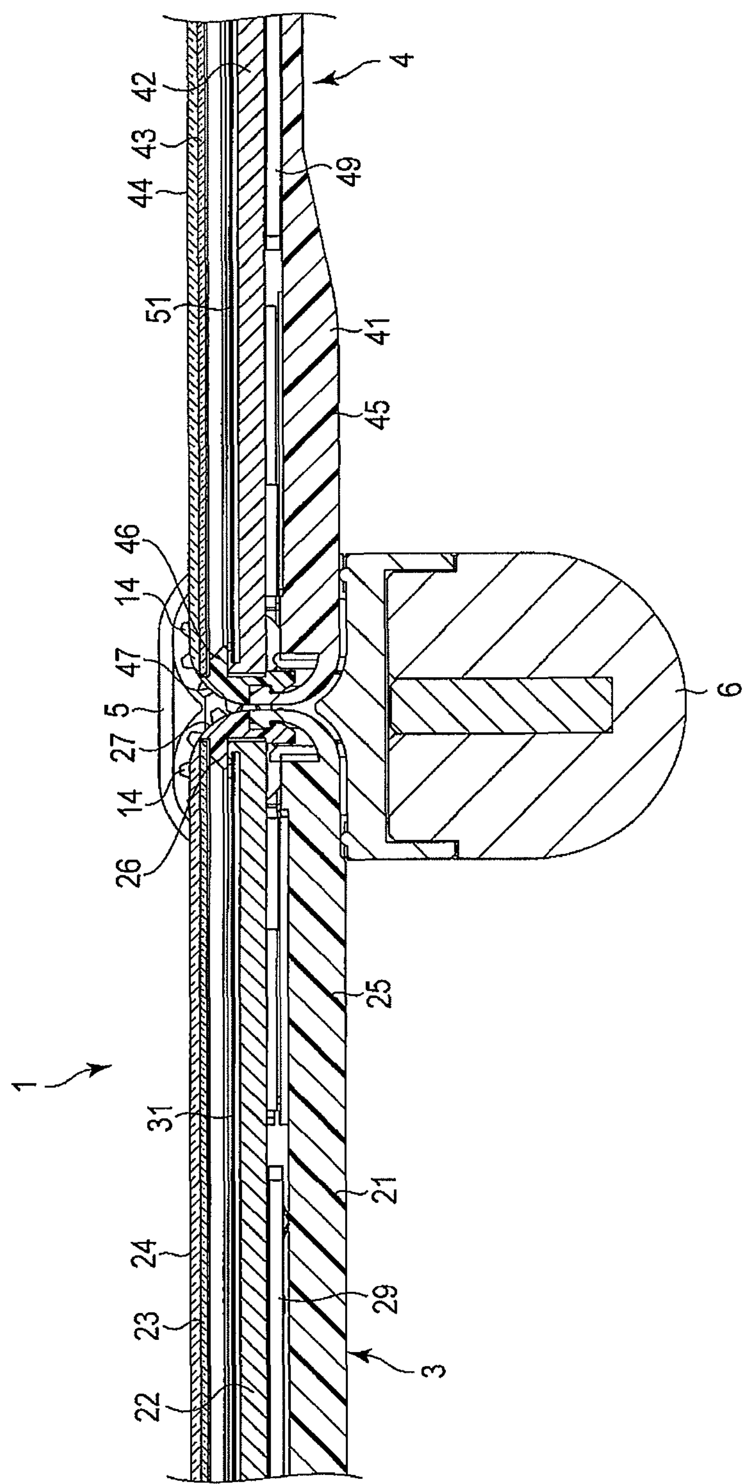
FIG. 2 is an exemplary cross sectional view showing the electronic apparatus according to the first embodiment.

FIG. 2 is an exemplary cross sectional view showing the structure of the electronic apparatus 1. As shown in FIG. 2, the first unit 3 and the second unit 4 each comprise gears 14 to be engaged with each other. With the gears 14, the first unit 3 and the second unit 4 pivot by the same angle as each other.

The protruding portion 6 is provided over from one of the hinge portion 5 to the other hinge portion 5. The protruding portion 6 is formed to have a length and a thickness to be easily graspable by the user. The protruding portion 6 comprises a removable battery unit and various types of interfaces such as a jog dial.

The first unit 3 comprises a first housing 21, a first display 22, a first touch panel 23 and a first panel 24.

As shown in FIG. 1, the first housing 21 is formed into roughly a rectangular shape. The first housing 21 comprises a base 25, a frame 26, an end portion 27 and an opening 28. The base 25 is fixed into the frame 26. The frame 26 of the first housing 21 faces the second unit 4 at the close position. The frame 26 encloses the opening 28. As shown in FIG. 2, the end portion 27 of the first housing 21 faces the second unit 4 at the open position. The cross section of the end portion 27 is formed into an arc shape. With this structure, it is possible to prevent the end portion 27 of the first housing 21 from bumping on the second unit 4 when the first unit 3 is pivoted.

The first housing 21 houses various electronic parts such as the first display 22, first touch panel 23 and a printed circuit board 29. For example, an MPU is mounted on the printed circuit board 29. The MPU serves to control the electronic apparatus 1.

The first display 22 is, for example, a liquid crystal display. It should be noted that the first display 22 is not limited to this type, but it may alternatively be some other type of display such as the organic electroluminescence display.

The first display 22 is formed into roughly a rectangular shape, and comprises the first display portion 31. The first display portion 31 is exposed from the opening 28 of the first housing 21 to the outside of the first housing 21. The first display 22 displays an image on the first display portion 31 under the control of, for example, the MPU mentioned above. It should be noted here that the term "image" used in this specification is defined as including various types of data displayable on the screen such as characters, symbols, numerals, documents, images, moving images and web pages, and thus the term is not limited to illustrations or photographs.

The MPU has the function of correct images to be displayed on the first display 22 and a second display 42, which will be explained later.

FIG. 3 is an exemplary enlarged cross sectional view of the structure around the hinge portion 5 of the electronic apparatus 1. Point P1 shown in FIG. 3 schematically shows the position of the first shaft portion 11, whereas point P2 shown in FIG. 3 schematically shows the position of the second shaft portion 12. As shown in FIG. 3, a portion of the first display 22 is located at a position between the first shaft portion 11 and the second shaft portion 12 at the open position.

The first touch panel 23 is a rectangular-shaped part having transparency, and it covers the first display portion 31 via a gap. The first touch panel 23 has a sensor of, for example, an electro-static type, and it senses the movement of a finger on the first panel 24.

The first panel 24 is formed of, for example, a transparent resin or glass material. The first panel 24 is mounted on the first housing 21 such as to close the opening 28. In this manner, the first display 22 and the first touch panel 23 are protected. The first panel 24 covers the first display portion 31 over the first touch panel 23.

As shown in FIG. 3, the first panel 24 comprises a first flat surface portion 33 and a first curved surface portion 34. The first flat surface portion 33 is formed into a rectangular shape. The first curved surface portion 34 is provided along an outer edge (on one side) of the first flat surface portion 33 set along the end portion 27 of the first housing 21. The first curved surface portion 34 is formed to have an arc shape which is continuous to the end portion 27 of the first housing 21 in its cross section. With this structure, it is possible to prevent the first curved surface portion 34 from bumping on the second unit 4 when the first unit 3 is pivoted. In FIG. 3, the first flat surface portion 33 and the first curved surface portion 34 are divided from each other schematically by an alternate long and two short dashes line.

As shown in FIG. 3, the first flat surface portion 33 is located above the first display portion 31 and it is overlaid on the first display portion 31, and also the first curved surface portion 34 is located above the first display portion 31 and it is overlaid on the first display portion 31. With this structure, the first panel 24 exposes the first display portion 31 from the first flat surface portion 33 and the first curved surface portion 34 to the outside of the first housing 21. The image displayed on the first display portion 31 is shown through the first flat surface portion 33 and through the first curved surface portion 34 as well. Further, the panel 24 and the frame 26 are formed as an integral unit, thereby achieving a solid structure. Therefore, electronic parts including the first display 22 can be protected from an external shock caused by dropping the apparatus or the like.

The second unit 4 comprises a second housing 41, a second display 42, a second touch panel 43 and a second panel 44.

As shown in FIG. 1, the second housing 41 is formed into roughly a rectangular shape. The second housing 41 comprises a base 45, a frame 46, an end portion 47 and an opening 48. The base 45 is fixed to the frame 46. The frame 46 of the second housing 41 faces the first unit 3 at the close position. The frame 46 encloses the opening 48. As shown in FIG. 2, the end portion 47 of the second housing 41 faces the first unit 3 at the open position. The cross section of the end portion 47 is formed into an arc shape. With this structure, it is possible to prevent the end portion 47 of the second housing 41 from bumping on the first unit 3 when the second unit 4 is pivoted.

The second housing 41 houses various electronic parts such as the second display 42, second touch panel 43 and a printed circuit board 49.

As in the case of the first display 22, the second display 42 is, for example, a liquid crystal display. It should be noted also here that the second display 42 is not limited to this type, but it may alternatively be some other type of display such as the organic electroluminescence display.

The second display 42 is formed into roughly a rectangular shape, and comprises a second display portion 51. The second display portion 51 is exposed from an opening 48 of the second housing 41 to the outside of the second housing 41. The second display 42 displays an image on the second display portion 51 under the control of, for example, the MPU mentioned above.

As shown in FIG. 3, a portion of the second display 42 is located at a position between the first shaft portion 11 and the second shaft portion 12.

The second touch panel 43 is a rectangular-shaped part having transparency, and it covers the second display portion 51 via a gap. The second touch panel 43 has a sensor of, for example, an electro-static type, and it senses the movement of a finger on the second panel 44.

The second panel 44 is formed of, for example, a transparent resin or glass material. The second panel 44 is mounted on the second housing 41 such as to close the opening 48. In this manner, the second display 42 and the second touch panel 43 are protected. The second panel 44 covers the second display portion 51 over the second touch panel 43.

As shown in FIG. 3, the second panel 44 comprises a second flat surface portion 53 and a second curved surface portion 54. The second flat surface portion 53 is formed into a rectangular shape. The second curved surface portion 54 is provided along an outer edge (on one side) of the second flat surface portion 53 set along the end portion 47 of the second housing 41. With this structure, the second curved surface portion 54 is set adjacent to the first curved surface portion 34 of the first panel 24. The second curved surface portion 54 is formed to have an arc shape which is continuous to the end portion 47 of the second housing 41 in its cross section. With this structure, it is possible to prevent the second curved surface portion 54 from bumping on the first unit 3 when the second unit 4 is pivoted. In FIG. 3, the second flat surface portion 53 and the second curved surface portion 54 are divided from each other schematically by an alternate long and two short dashes line.

As shown in FIG. 3, the second flat surface portion 53 is located above the second display portion 51 and it is overlaid on the second display portion 51, and also the second curved surface portion 54 is located above the second display portion 51 and it is overlaid on the second display portion 51. With this structure, the second panel 44 exposes the second display portion 51 from the second flat surface portion 53 and the second curved surface portion 54 to the outside of the second housing 41. The image displayed on the second display portion 51 is shown through the second flat surface portion 53 and through the second curved surface portion 54 as well. Further, the panel 44 and the frame 46 are formed as an integral unit, thereby achieving a solid structure. Therefore, electronic parts including the second display 42 can be protected from an external shock caused by dropping the apparatus or the like.

In order to make the screens further close to each other, the base 25 and frame 26 are not formed by fitting them to each other, but formed as an integral unit. Also, the base 45 and frame 46 are formed as an integral unit. In this manner, the thickness is decreased by the thickness of a portion which may have been created by the fitting assembly. Further, the first housing 21 and the second housing 41 are each formed by sheet metal, thereby achieving a thin but solid structure. As mentioned above, the first panel 24 and the second panel 44, and the first housing 21 and second housing 41 formed of the metal sheet are molded respectively as an integral unit, and therefore it is expected to be able to make the screens even more closer to each other.

FIG. 4 shows an example of the state in which the first unit 3 displays an image. As shown in FIG. 4, the first display portion 31 of the first unit 3 shows images. In the case where an image is viewed through the first curved surface portion 34, the portion of the image which corresponds to the first curved surface portion 34 is viewed as an image distorted according to the curvature of the first curved surface portion 34, the refractive index of the constituting member of the surface portion 34. More specifically, the image displayed in, for example, the area below the first curved surface portion 34, of the entire region of the display screen of the first display portion 31 in FIG. 3, is viewed as an image swelling in the right and left directions (lateral directions) as seen through the first curved surface portion 34. For this reason, as shown in FIG. 4, a width W1 of an image which includes a portion corresponding to the first curved surface portion 34 is viewed to differ from a width W2 of a portion of the image, which corresponds to the first flat surface portion 33.

FIG. 5 shows an example of the state in which an image displayed by the first unit 3 is corrected. The MPU mounted on the printed circuit board 29 corrects the image segment of the entire image displayed on the display portion 31, which is to be displayed in the portion covered by the first curved surface portion 34 according to the curvature and the refractive index of the curved surface portion 34. That is, the MPU corrects the image segment to be displayed at the location corresponding to the first curved surface portion 34 in such a manner that the length (proportion) of the image segment in the lateral direction is smaller in relation to the length (proportion) of the image segment in the longitudinal direction. In other words, the MPU corrects, for example, the width of the image segment of the portion corresponding to the first curved surface portion 34, thereby forming an image in which the proportion in the lateral direction to the longitudinal direction is smaller than that of the image to be displayed on the first flat surface portion 33. In this manner, the image segment of the portion corresponding to the first curved surface portion 34 is viewed at a proportional size equal to that of the image of the portion corresponding to the first flat surface portion 33 as seen through the first curved surface portion 34. That is, the MPU converts and correct the image to be displayed on the first display portion 31 into an image having various aspect ratios (length to width) depending on the location of the display image on the display portion 31. Then, the first display portion 31 displays the corrected image segment in the portion corresponding to the first curved surface portion 34. That is, the first display portion 31 displays the image segment at the aspect ratio according to the curvature and the refractive index of the first curved surface portion 34 in the portion corresponding to the first curved surface portion 34 of the display screen of the display portion 31. In this manner, the image segment projected (irradiated) towards the first display portion 31 (in the front direction) through the first curved surface portion 34 is proportional in size to the image segment projected (irradiated) towards the first display portion 31 (in the front direction) through the first flat surface portion 33.

Similarly, the MPU corrects the image segment corresponding to the second curved surface portion 54 of the second display potion 51. In this manner, the image segment corresponding to the second curved surface portion 54 is viewed at a proportional size equal to that of the image displayed in the portion corresponding to the second flat surface portion 53 as seen through the second curved surface portion 54. That is, the second display portion 51 displays the corrected image segment in the portion corresponding to the second curved surface portion 54.

According to the electronic apparatus 1 of the above-described structure, the first panel 24 exposes the first display portion 31 from the first flat surface portion 33 and the first curved surface portion 34 to the outside of the first housing 21. As shown in FIG. 3, the first curved surface portion 34 is formed along the end portion 27 of the first housing 21 into an arc shape in its cross section to make the first unit 3 and the second unit 4 to pivot with regard to each other. With such a structure that the first display portion 31 is exposed from the first curved surface portion 34, the first display portion 31 can be placed close to the end portion 27 of the first housing 21.

Further, the second panel 44 exposes the second display portion 51 from the second flat surface portion 53 and the second curved surface portion 54 to the outside of the second housing 41. The second curved surface portion 54 is formed along the end portion 47 of the second housing 41 into an arc shape in its cross section to make the first unit 3 and the second unit 4 to pivot with regard to each other. With such a structure that the second display portion 51 is exposed from the second curved surface portion 54, the second display portion 51 can be placed close to the end portion 47 of the second housing 41.

The first curved surface portion 34 and the second curved surface portion 54 are set to be adjacent to each other. With the above-described structure, the first display portion 31 and the second display portion 51 are set close to each other, and thus the first display portion 31 and the second display portion 51 can be viewed more easily as they are seen as one large display portion.

The first display portion 31 displays the corrected image segment in the portion corresponding to the first curved surface portion 34 in such a manner that the image segment is viewed at a proportional size equal to that of the image of the portion corresponding to the first flat surface portion 33 as seen through the first curved surface portion 34. Thus, the distortion of the image, which may occur when the image of the first image portion 31 is exposed directly from the first curved surface portion 34, can be resolved.

On the other hand, the second display portion 51 displays the corrected image segment in the portion corresponding to the second curved surface portion 54 in such a manner that the image segment is viewed at a proportional size equal to that of the image of the portion corresponding to the second flat surface portion 53 as seen through the second curved surface portion 54. Thus, the distortion of the image, which may occur when the image of the second image portion 51 is exposed directly from the second curved surface portion 54, can be resolved.

Figure 6:
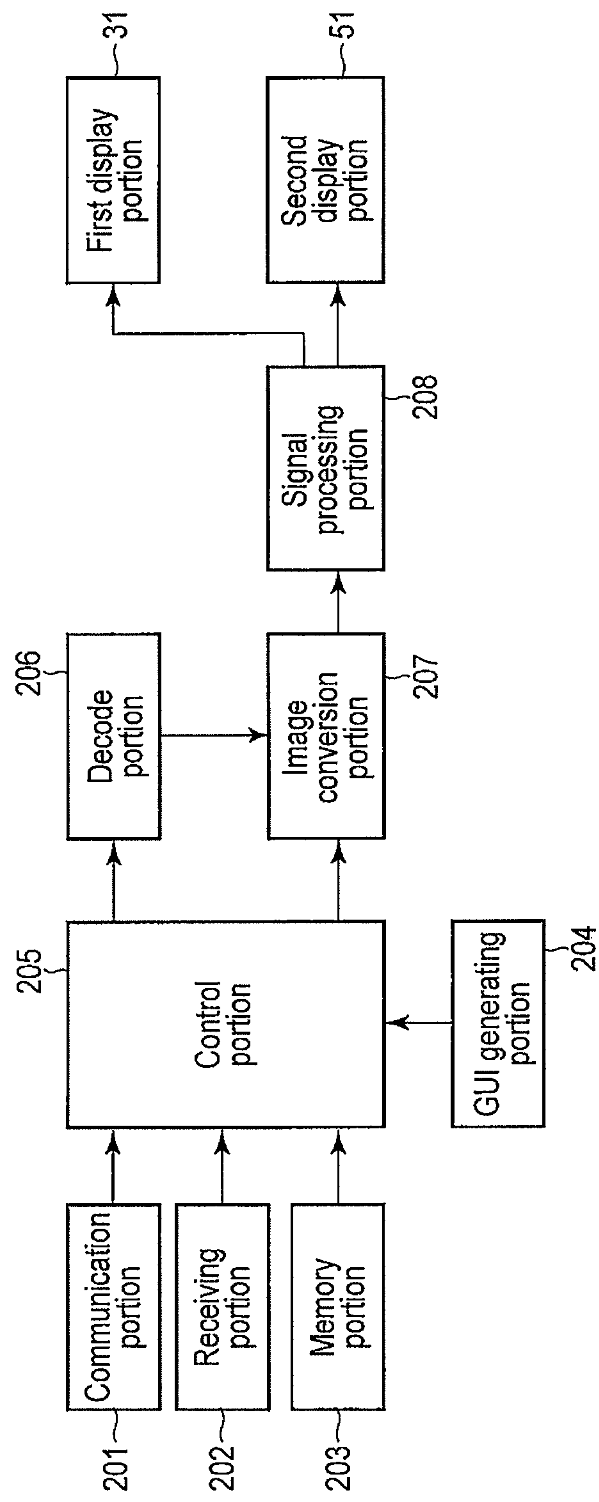
FIG. 6 is an exemplary diagram showing the functional blocks of the electronic apparatus according to the first embodiment.

FIG. 6 shows an example of the functional blocks of the electronic apparatus 1. The electronic apparatus 1 comprises functional blocks including a communication portion 201, a reception portion 202, a memory portion 203, a GUI generating portion 204, a control portion 205, a decode portion 206, an image conversion portion 207, a signal processing portion 208, etc.

The communication portion 201 is a communication module such as a wireless or wired LAN, through which various types of data of images (video) and the like are received via a network such as the Internet or a home network. The receiving portion 202 is a receiver device such as a television receiving tuner, and receives BS digital broadcast waves and digitalized terrestrial broadcast waves to obtain image (video) signals superimposed on the broadcast waves. The memory portion 203 is a memory device such as HDD or SSD, and stores the image (video) signal, etc. in accordance with an instruction from the control portion 205. The GUI generating portion 204 generates various types of GUI images in accordance with an instruction from the control portion 205.

The control portion 205 has the function of controlling various functional blocks of the electronic apparatus 1. For example, the control portion 205 stores the images received by the communication portion 201 and the receiving portion 202 on the memory portion 203. Further, the control portion 205 makes the decode portion 206 to decode the images stored on the memory portion 203 or the images received by the communication portion 201 and the receiving portion 202. Further, the control portion 205 instructs the GUI generating portion 204 to generate GUI images in accordance with the operating system, and outputs the GUI images generated by the GUI generating portion 204 to the image conversion portion 207. The decode portion 206 decodes the data of the image input from the control portion 205 and output the decoded data to the image conversion portion 207.

The image conversion portion 207 corrects the images input from the control portion 205 and the decode portion 206. That is, the image conversion portion 207 corrects the width or the like of the image segment to be displayed at the locations corresponding to the first curved surface portion 34 and the second curved surface portion 54 of the images to be displayed on the first display portion 31 and the second display portion 51 as described above in FIGS. 4 and 5. The image conversion portion 207 outputs the corrected images to the signal processing portion 208. The signal processing portion 208 converts the data of the images input from the image conversion portion 207 into image signals of a format displayable by the first display portion 31 and the second display portion 51, and outputs the converted signals to the first display portion 31 and the second display portion 51.

Note that the above-described functional blocks are realized by various types of hardware mounted on the electronic apparatus 1 or various types of software to be executed by a processor such as MPU.

Next, with reference to FIG. 7, the second embodiment will now be described. In the following embodiments which will now be described, the same structural parts as those of the first embodiment will be designated by the same reference numerals, and detailed descriptions therefore will not be repeated.

FIG. 7 is an exemplary cross sectional view showing the periphery of the hinge portion 5 of the electronic apparatus 1 according to the second embodiment. As shown in FIG. 7, the first unit 3 comprises a first lens 61. The first lens 61 is a Fresnel lens having a rectangular plate shape. It should be note that the first lens 61 is not limited to this, but it may alternatively be a lens of some other shape.

The first lens 61 is interposed between the first display 22 and the first touch panel 23. That is, the first lens 61 is interposed between the first display 22 and the first panel 24. An air layer 62 (gap) is interposed between the first lens 61 and the first display 22, and the first lens 61 has saw-shaped projections and recesses facing on the side of the air layer 62. It should be noted here that it is not absolutely necessary to have an air layer between the first lens 61 and the first display 22, but it is preferable that the location of the air layer 62 should be filled with a transparent substance (material) having a refractive index significantly differing from that of the first lens 61.

The first lens 61 is a lens which magnifies the image displayed on the first display portion 31. As the first lens 61 refracts light, the image can be viewed further to the position close to the end portion 27 of the first housing 21 than the position originally supposed to be seen in the first curved surface portion 34. In other words, the first lens 61 refracts the light irradiated from the first display portion 31 over to the side of the end portion 27. Thus, the first lens 61 makes it possible for the user to be able to see the image segment of the portion corresponding to the first curved surface portion 34 of the first display portion 31 at the position off from the first display portion 31.

The image which is made to be seen by the first lens 61 is distortedly viewed, and therefore in order to avoid this, the MPU of the printed circuit board 29 corrects the image segment of the portion corresponding to the first curved surface portion 34. In this manner, the image segment of the portion corresponding to the first curved surface portion 34 can be viewed at a proportional size equal to that of the image displayed on the portion corresponding to the first flat surface portion 33 as seen through the first lens 61.

As shown in FIG. 7, the second unit 4 comprises a second lens 64. The second lens 64 is a Fresnel lens having a rectangular plate shape. It should be note that the second lens 64 is not limited to this, but it may alternatively be a lens of some other shape.

The second lens 64 is interposed between the second display 42 and the second touch panel 43. That is, the second lens 64 is interposed between the second display 42 and the second panel 44. An air layer 65 (gap) is interposed between the second lens 64 and the second display 42, and the second lens 64 has projections and recesses facing on the side of the air layer 65. As mentioned above, it is alternatively possible here that the location of the air layer 65 is filled with a transparent substance (material) having a low refractive index.

The second lens 64 is a lens which magnifies the image displayed on the second display portion 51. As the second lens 64 refracts light, the image can be viewed further to the position close to the end portion 47 of the second housing 41 than the position originally supposed to be seen in the second curved surface portion 54. Thus, the second lens 64 makes it possible for the user to be able to see the image segment of the portion corresponding to the second curved surface portion 54 of the second display portion 51 at the position off from the second display portion 51.

The image which is made to be seen by the second lens 64 is distortedly viewed, and therefore in order to avoid this, the MPU corrects the image segment of the portion corresponding to the second curved surface portion 54. In this manner, the image segment of the portion corresponding to the second curved surface portion 54 can be viewed at a proportional size equal to that of the image displayed on the portion corresponding to the second flat surface portion 53 as seen through the second lens 64.

According to the electronic apparatus 1 of the above-described structure, as the first lens 61 refracts light, the image can be viewed further to the position close to the end portion 27 of the first housing 21 than the position originally supposed to be seen in the first curved surface portion 34. In this manner, the first display portion 31 and the second display portion 51 can be viewed more easily as they are seen as one large display portion.

The first display portion 31 displays the corrected image in the portion corresponding to the first curved surface portion 34 so as to make the corrected image viewed at a proportional size equal to that of the image displayed on the portion corresponding to the first flat surface portion 33 as seen through the first lens 61. In this manner, the distortion of an image, which may occur when displaying the image through the first lens 61, can be removed.

Further, as the second lens 64 refracts light, the image can be viewed further to the position close to the end portion 47 of the second housing 41 than the position originally supposed to be seen in the second curved surface portion 54. In this manner, the first display portion 31 and the second display portion 51 can be viewed more easily as they are seen as one large display portion.

The second display portion 51 displays the corrected image in the portion corresponding to the second curved surface portion 54 so as to make the corrected image viewed at a proportional size equal to that of the image displayed on the portion corresponding to the second flat surface portion 53 as seen through the second lens 64. In this manner, the distortion of an image, which may occur when displaying the image through the second lens 64, can be removed.

Figure 8:
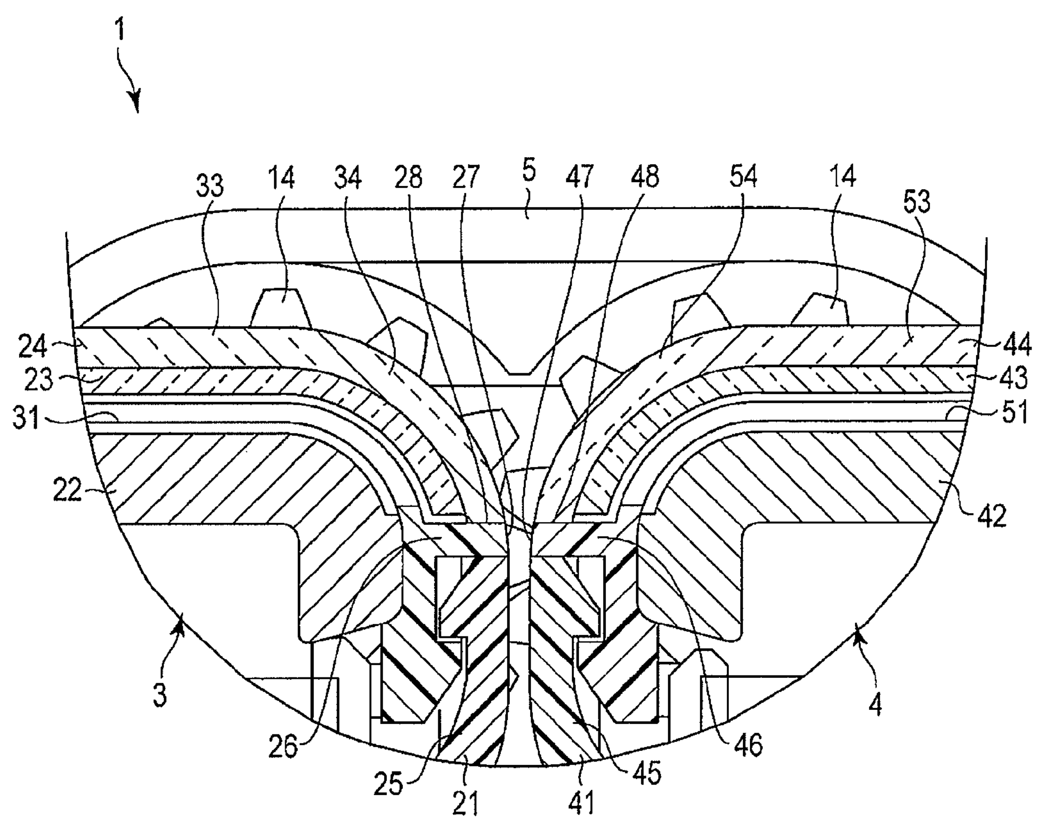
FIG. 8 is an exemplary cross sectional view showing the electronic apparatus according to the third embodiment.

Next, with reference to FIG. 8, the third embodiment will now be described. FIG. 8 is an exemplary cross sectional view showing the electronic apparatus 1 according to the third embodiment. As shown in FIG. 8, a first display 22 and a first touch panel 23 are curved in agreement with a first curved surface portion 34.

The first display 22 is, for example, a flexible LCD. Note that the first display 22 is not limited to this type, but it may alternatively be some other display having flexibility. A first display portion 31 of the first display 22 is exposed from a first flat surface portion 33 and a first curved surface portion 34 to the outside of the first housing 21. The first touch panel 23 has flexibility and is layered on an inner surface of the first panel 24.

A second display 42 and a second touch panel 43 are curved in agreement with a second curved surface portion 54.

The second display 42 is, for example, a flexible LCD. Note that the second display 42 is not limited to this type, but it may alternatively be some other display having flexibility. A second display portion 51 of the second display 42 is exposed from a second flat surface portion 53 and a second curved surface portion 54 to the outside of the second housing 41. The second touch panel 43 has flexibility and is layered on an inner surface of the second panel 44.

According to the electronic apparatus 1 having the above-described structure, the first display 22 is curved in agreement with the first curved surface portion 34. With this structure, the first display portion 31 is set further closer to an end portion 27 of a first housing 21.

The second display 42 is curved in agreement with the second curved surface portion 54. With this structure, the second display portion 51 is set further closer to an end portion 47 of a second housing 41.

Figure 9:
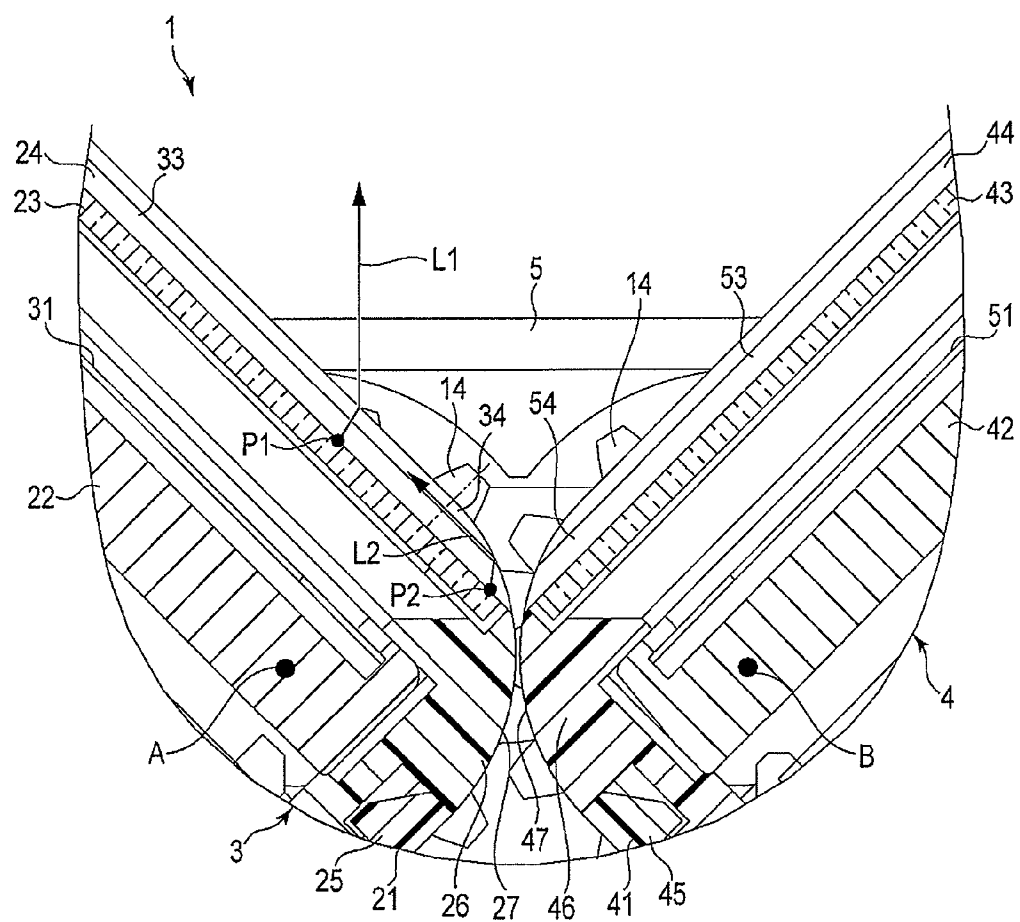
FIG. 9 is an exemplary cross sectional view explaining a trace of light in the electronic apparatus according to the first embodiment.

Next, with reference to FIGS. 9 to 13, the fourth embodiment will now be described. FIG. 9 is an exemplary cross sectional view explaining a trace of light in the electronic apparatus 1 according to the first embodiment. FIG. 10 is an exemplary cross sectional view explaining a trace of light in the electronic apparatus 1 according to the third embodiment.

In each of the above-mentioned embodiments, each directed to a double-screen device in which the panel to cover the display portion has a curved surface portion, there are some cases where a part of the display portion cannot be viewed from the user depending on the inclining angle of the display screen.

For example, the case where the first unit 3 and the second unit 4 are opened by an angle of 90° in the first embodiment as shown in FIG. 9 will now be described. It should be noted here that the opening angle between the first unit 3 and the second unit 4 is equal to the opening angle between the first housing 21 and the second housing 41.

The light from a pixel P1 on the first display portion 31 is viewed by the user, for example, through the trace indicated by the arrow L1 in FIG. 9. The pixel P1 faces to the first flat surface portion 33 of the first panel 24.

On the other hand, the light from a pixel P2 on the first display portion 31 totally reflects on an interface between the first panel 24 and the air to, in some cases, pass through the trace indicated by the arrow L2 in FIG. 9. The pixel P2 faces a first curved surface portion 34 of the first panel 24.

Similarly, the case where the first unit 3 and the second unit 4 are opened by an angle of 90° in the third embodiment as shown in FIG. 10 will now be described. In this case, the light from a pixel P3 on the first display portion 31 reaches the eyes of the user, for example, through the trace indicated by the arrow L3 in FIG. 10. On the other hand, the light from a pixel P4 on the first display portion 31 totally reflects and does not reach the user's eyes. The pixel P3 faces a first flat surface portion 33, whereas the pixel P4 faces the first curved surface portion 34.

That is, of the first display portion 31, the image of a further part of the section covered by the first curved surface portion 34 cannot be viewed in some cases depending on the opening angle between the first and second units 3 and 4. This is also the case for the second display portion 51. In order to avoid this inconvenience, the electronic apparatus 1 of this embodiment detects the opening angle between the first and second units 3 and 4, and adjusts it such that the display positions of the images to be displayed on the first and second display portions 31 and 51 are set to the positions which can be viewed from the user side.

Figure 12:
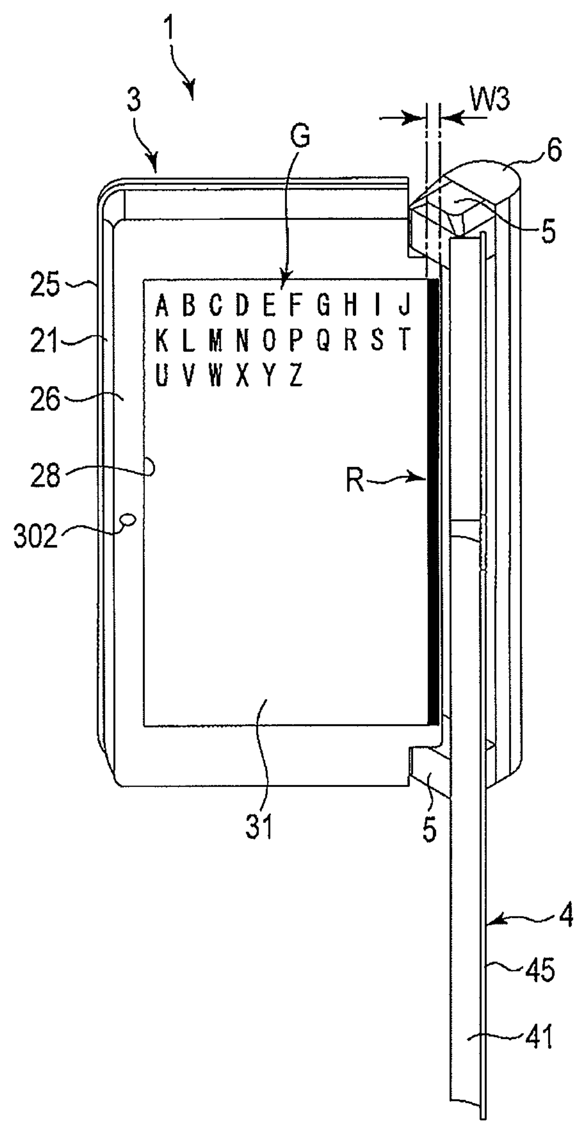
FIG. 12 is an exemplary perspective view showing the electronic apparatus according to the fourth embodiment in which the first and second units are opened by an angle of 90°.

The operation of the first unit 3 will now be described as a representative example. The operation of the second unit 4 is similar to that of the first unit 3 and therefore an explanation thereof will be omitted. FIG. 11 is an exemplary perspective view showing the electronic apparatus 1 in which the first and second units are opened by an angle of 180°. FIG. 12 is an exemplary perspective view showing the electronic apparatus 1 in which the first and second units are opened by an angle of 90°.

In the case where the first and second units 3 and 4 are opened by an angle of, for example, 180° as shown in FIG. 11, the entire region of the first display portion 31 can display an image G. In the case where the first and second units 3 and 4 are opened by an angle of 90° as shown in FIG. 12, the first display portion 31 display an image G whose display position has been adjusted. In other words, when the opening angle becomes narrow, the electronic apparatus 1 adjusts the display position of the image G. That is, when the opening angle becomes narrow, the electronic apparatus 1 displays the image G displayed in the vicinity of the inner edge side of the first display portion 31 (that is, on the end portion 27 side of the first housing 21) when the opening angle is wide while pulling the image over to the outer side of the first display portion 31.

The region R colored in black in the first display portion 31 in FIG. 12 is the region which can be not viewable by the user. The image G is displayed while being pulled over to the outer side of the first display portion 31 by the width W3 of the region R. In other words, the image G is displayed on the first display portion 31 while negotiating around the region R. This region R may display an image or may not display it. Also, the distance which the image G is pulled over may be smaller than the width W3 of the region R.

It is alternatively possible that the electronic apparatus 1 picks up the image of the face or eyes of the user for its position, and the display position of the image G is adjusted in accordance with the position of the user's face or eye and the opening angle between the first and second units 3 and 4. In other words, even in the case where, for example, the first and second units 3 and 4 are opened at an angle of 180°, the above-described adjustment may be carried out when the angle of the first display portion 31 with respect to the position of the user's face or eye is smaller than a predetermined angle.

FIG. 13 is a block diagram of the functions of the electronic apparatus 1 according to the fourth embodiment. The electronic apparatus 1 of the fourth embodiment further comprises an angle detection portion 301 and an image pick-up portion 302. The image pick-up portion 302 is an example of a position detection portion.

The angle detection portion 301 detects the opening angle between the first and second units 3 and 4. The control portion 205 determines the position where the image G is to be displayed in accordance with the opening angle between the first and second units 3 and 4 detected by the angle detection portion 301. In other words, the image G is displayed in different positions depending on the opening angle detected by the angle detection portion 301.

In the case where, for example, the opening angle between the first and second units 3 and 4 is smaller than 90°, the control portion 205 pulls the position to display the image G over to the ouster side of the first display portion 31. The operation of the control portion 205 is not limited to this, but it is alternatively possible that the control portion 205, when the opening angle between the first and second units 3 and 4 is smaller than several predetermined angles such as 150°, 120°, 90° and 60°, pulls the position to display the image G over to the ouster side of the first display portion 31, stepwise. It is also possible that the control portion 205 pulls the position to display the image G over to the ouster side of the first display portion 31 while interlocking with the opening angle between the first and second units 3 and 4.

As shown in FIG. 11, the image pick-up portion 302 is provided in, for example, the first unit 3. The image pick-up portion 302 picks up an image of the user operating the electronic apparatus 1 through an opening made in the frame 26 of the first housing 21.

The control portion 205 determines the position of the user by recognizing, for example, the user's face from the image picked up by the image pick-up portion 302. Then, the control portion 205 adjusts the display position of the image G in accordance with the opening angle between the first and second units 3 and 4 and the user's position.

In the electronic apparatus 1 having the above-described structure, the first and second displays 22 and 42 each display the image G in different positions in accordance with the opening angle between the first and second units 3 and 4. With this structure, even in the case where the opening angle between the first and second units 3 and 4 is set smaller, it is possible to prevent the portions of the image displayed in the inner edge portion of each of the first and second display portions 31 and 51 from becoming not viewable from the user.

The first and second displays 22 and 42 each display the image G in different positions in accordance with the position of the user detected by the image pick-up portion 302. With this structure, it is possible to prevent the portions of the image displayed in the inner edge portion of each of the first and second display portions 31 and 51 from becoming not viewable from the user, which may occur depending on the user's position.

In the above-described embodiments, the first and second curved surface portions 34 and 54 and some parts are described by such expressions as curvature and arc, but these portions may not necessarily be of a smooth arc shape. In other words, it is alternatively possible that the panel is bent into, for example, a polygonal shape in the vicinity of the inner edge portion, to make an ark shape as a whole.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
- a first housing;
- a first display in the first housing, the first display comprising a first display portion;
- a first transparent panel configured to cover the first display portion, the first transparent panel comprising a first flat surface portion and a first curved surface portion along an outer edge of the first flat surface portion,
- a second housing;
- a second display in the second housing and comprising a second display portion;
- a second transparent panel configured to cover the second display portion, the second transparent panel comprising a second flat surface portion and a second curved surface portion along an outer edge of the second flat surface portion;

a hinge portion configured to join the first housing and the second housing to be rotatable with respect to each other, wherein the first display portion is configured to display images in a location corresponding to the first flat surface portion and a location corresponding to the first curved surface portion at different aspect ratios from each other, wherein the second display portion is configured to display images in a location corresponding to the second flat surface portion and a location corresponding to the second curved surface portion at different aspect ratios from each other, wherein the image on the first display portion at the location corresponding to the first curved surface portion is configured to be corrected as being projected through the first curved surface portion to be proportionally equal in size to that of the image configured to be displayed on the first display portion at the location corresponding to the first flat surface portion as projected through the first flat surface portion, and wherein the image on the second display portion at the location corresponding to the second curved surface portion is configured to be corrected as being projected through the second curved surface portion to be proportionally equal in size to that of the image configured to be displayed on the second display portion at the location corresponding to the second flat surface portion as projected through the second flat surface portion, the electronic apparatus further comprising:

a first lens between the first display and the first panel, the first lens configured to make the image of the location corresponding to the first curved surface portion of the first display portion viewable at a position off from the first display portion.

2. The electronic apparatus of claim 1, wherein the first display portion is configured to display in a portion corresponding to the first curved surface portion a corrected image to be proportionally equal in size to that of the image displayed in a portion corresponding to the first flat surface, as viewed through the first lens.

3. The electronic apparatus of claim 1, further comprising:

a second lens between the second display and the second panel, the second lens configured to make the image of the location corresponding to the second curved surface portion of the second display portion viewable at a position off from the second display portion.

4. The electronic apparatus of claim 1, wherein the second display portion is configured to display in a portion corresponding to the second curved surface portion a corrected image to be proportionally equal in size to that of the image displayed in a portion corresponding to the second flat surface, as viewed through the second lens.

5. The electronic apparatus of claim 1, wherein the first display has flexibility and is curved in agreement with the first curved surface portion.

6. An electronic apparatus comprising:

a first housing;

a second housing;

a hinge portion comprising a first shaft portion configured to pivotably support the first housing and a second shaft portion configured to pivotably support the second housing;

a first display in the first housing, a portion of the first display located between the first shaft portion and the second shaft portion;

a first transparent panel comprising a first curved surface portion configured to cover the first display;

a second display in the second housing, a portion of the second display located between the first shaft portion and the second shaft portion; and a second transparent panel comprising a second curved surface portion configured to cover the second display, wherein the first and second displays are configured to display images at different aspect ratios from each other in accordance with the locations of the first and second displays, the electronic apparatus further comprising an angle detection portion configured to detect an opening angle between the first housing and the second housing, wherein the first display is configured to display the image in different positions in accordance with the opening angle detected.

7. The electronic apparatus of claim 6, wherein the first display is configured to display the image while pulling the image over to a side away from the second display when the opening angle is smaller than a predetermined angle.

8. The electronic apparatus of claim 6, further comprising a position detection portion configured to detect a position of a user, wherein the first and second displays each are configured to display the image in different positions in accordance with the detected position of the user.

* * * * *